US008494767B2

(12) United States Patent
Bugnariu

(10) Patent No.: US 8,494,767 B2
(45) Date of Patent: Jul. 23, 2013

(54) METHOD AND APPARATUS FOR AUTOMATICALLY DETERMINING PRACTICALITY OF A TRIP

(75) Inventor: Calin Nicolaie Bugnariu, Irving, TX (US)

(73) Assignee: Research In Motion Limited, Waterloo (CA)

( * ) Notice: Subject to any disclaimer, the term of this patent is extended or adjusted under 35 U.S.C. 154(b) by 526 days.

(21) Appl. No.: 12/507,131

(22) Filed: Jul. 22, 2009

(65) Prior Publication Data

US 2011/0022313 A1    Jan. 27, 2011

(51) Int. Cl.
*G01C 21/00*    (2006.01)
(52) U.S. Cl.
USPC .............................. 701/468; 701/438; 705/6
(58) Field of Classification Search
USPC .............................. 701/200, 204, 211; 705/6
See application file for complete search history.

(56) References Cited

U.S. PATENT DOCUMENTS

| | | | |
|---|---|---|---|
| 6,278,935 B1 * | 8/2001 | Kaplan et al. ................. | 701/533 |
| 6,401,034 B1 | 6/2002 | Kaplan | |
| 6,622,083 B1 * | 9/2003 | Knockeart et al. ............ | 701/533 |
| 7,698,062 B1 * | 4/2010 | McMullen et al. ............ | 701/438 |
| 2006/0129438 A1 | 6/2006 | Robinson ........................... | 705/6 |
| 2007/0219706 A1 | 9/2007 | Sheynblat | |
| 2010/0268449 A1 * | 10/2010 | Feng ............................ | 701/201 |
| 2011/0125398 A1 * | 5/2011 | Bos ............................... | 701/204 |
| 2012/0059584 A1 * | 3/2012 | Nesbitt et al. ................. | 701/527 |

OTHER PUBLICATIONS

Paventi, J., "How to Navigate to a location on a TomTom GPS", http://www.ehow.com/how_4489041_navigate-location-tomtom-gps.html, 2 pages, retrieved on Jul. 20, 2009.
Magellan GPS, "News and Events: Magellan brings new level of ease and simplicity to auto navigation with new onetouchtm user interface that puts drivers in control of their travel experience", http://www.magellangps.com/news/releases/viewRelease.asp?id=.577, 3 pages, retrieved on Jul. 20, 2009.
Google Maps API, "How do I get the proximity of coordinates along a route?", http://groups.google.com/group/Google-Maps-API/browse_thread/thread/cedd2449674b9125, 5 pages, retrieved on Jul. 20, 2009.
Bill Chadwick's Google Maps Demos, http://www.bdcc.co.uk/Gmaps/BdccGmapBits.htm, 4 pages, retrieved on Jul. 20, 2009.
Where's the path?, http://www.wheresthepath.googlepages.com/wheresthepath.htm, 1 page, retrieved on Jul. 20, 2009.
European Search Report that issued on Mar. 31, 2010 from European Patent Application No. 09 16 6114.

* cited by examiner

*Primary Examiner* — Thomas Black
*Assistant Examiner* — Shardul Patel
(74) *Attorney, Agent, or Firm* — Novak Druce Connolly Bove + Quigg LLP

(57) ABSTRACT

Provided is a method and an apparatus for automatically determining practicality of a trip. A mobile device obtains at least one point of interest among a starting location and a finishing location for a trip. In accordance with an embodiment of the disclosure, for each point of interest, the mobile device automatically determines an indication of practicality for making the point of interest an intermediate location to be visited during the trip based on both the starting location and the finishing location for the trip. By considering both the starting location and the finishing location, the points of interest can be presented to the user in a manner that reflects how practical it is to visit the points of interest given that the user is to end up at the finishing location.

16 Claims, 9 Drawing Sheets

METHOD AND APPARATUS FOR AUTOMATICALLY DETERMINING PRACTICALITY OF A TRIP

FIELD OF THE DISCLOSURE

This disclosure relates to computing devices, and more particularly to trip determination by computing devices.

BACKGROUND

A location-based service (LBS) is an information and entertainment service that makes use of the geographical position of one or more mobile devices. Some applications involve trip determination by computing devices for navigating a user from a starting location to a finishing location. Location information can be generated using GPS technology or other means. Some applications involve searching for POI (points of interest) in vicinity of a current location. Search results are typically provided in increasing order of distance from the current location. This allows the user to ascertain which POI is nearest to him.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to a broad aspect, there is provided a method for execution in a computing device, the method comprising: obtaining a starting location and a finishing location for a trip; obtaining at least one point of interest; and for each point of interest, automatically determining an indication of practicality for making the point of interest an intermediate location to be visited during the trip based on both the starting location and the finishing location for the trip.

According to another broad aspect, there is provided a computer readable medium having computer executable instructions stored thereon for execution on a processor of a computing device so as to implement the method summarised above.

According to another broad aspect, there is provided a computing device configured to implement the method summarised above.

Other aspects and features of the present disclosure will become apparent, to those ordinarily skilled in the art, upon review of the following description of the specific embodiments of the invention.

Apparatus for Determining Practicality

Figure 1:
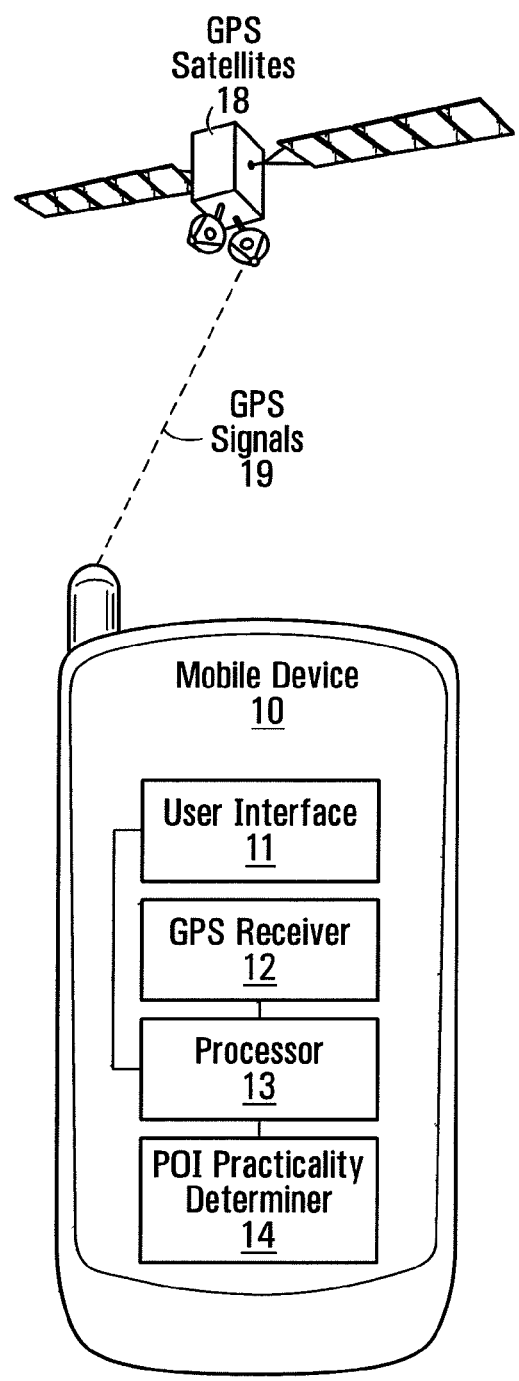
FIG. 1 is a block diagram of an example communication system featuring a mobile device.

Referring first to FIG. 1, shown is a block diagram of an example communication system featuring a mobile device 10 and GPS satellites 18 (only one shown for simplicity). There might be other devices, but they are not shown for simplicity. The mobile device 10 has a user interface 11, a GPS receiver 12, a processor 13, and a POI (point of interest) practicality determiner 14. The mobile device 10 might have other components, but they are not shown for simplicity. For instance, the mobile device 10 might also have a wireless access radio for communication with a wireless network (not shown).

Figure 2:
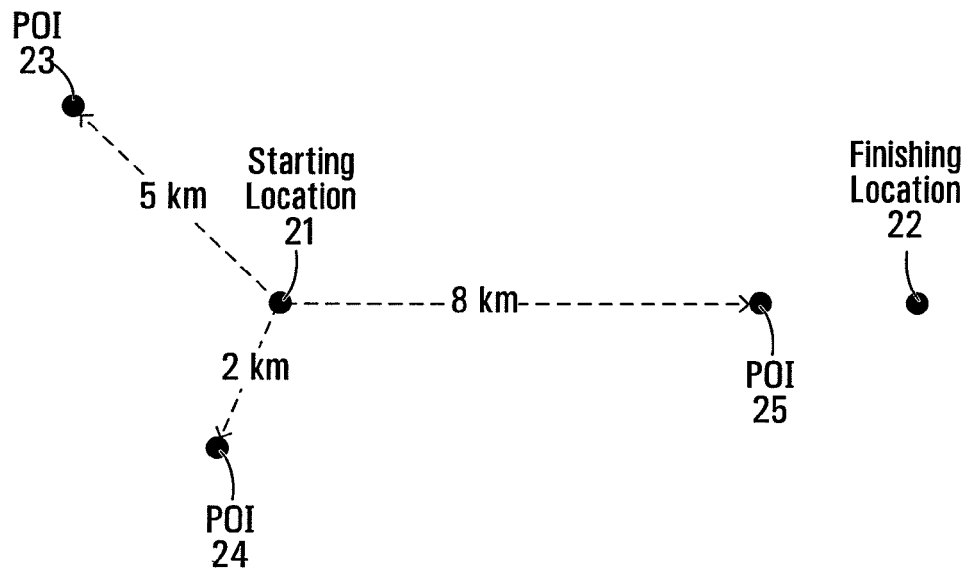
FIG. 2 is a schematic of a map depicting a plurality of points of interest among a starting location and a finishing location for a trip.

The operation of the communication system will now be described by way of example with reference to FIG. 2. FIG. 2 is a schematic of a map depicting a plurality of points of interest 23,24,25 among a starting location 21 and a finishing location 22 for a trip. The user of the mobile device 10 is to travel from the starting location 21 to the finishing location 22. However, during the trip the user wishes to visit at least one of the points of interest 23,24,25. For this example it is assumed that the user is leaving work (i.e. starting location 21) and wishes to stop for coffee (i.e. point of interest 23,24, 25) before arriving at home (i.e. finishing location 22).

The mobile device 10 obtains the starting location 21 and the finishing location 22 for the trip. It is noted that the mobile device 10 "obtaining" the starting location 21 and the finishing location 22 can involve the mobile device 10 receiving and/or determining the starting location 21 and the finishing location 22. In some implementations, the mobile device 10 determines the starting location 21 using GPS technology. This involves the mobile device 10 receiving GPS signals 19 from the GPS satellites 18 using its GPS receiver 12. In some implementations, the mobile device 10 receives the finishing location 22 from the user via the user interface 11. More generally, any appropriate manner in obtaining the starting location 21 and the finishing location 22 can be employed.

The mobile device 10 obtains at least one point of interest. In some implementations, as in the present example, the mobile device 10 obtains a plurality of points of interest. In this example, it is assumed that the points of interest 23,24,25 are coffee shops. It is noted that the mobile device 10 "obtaining" the points of interest 23,24,25 can involve the mobile device 10 receiving and/or determining the points of interest 23,24,25. In some implementations, the mobile device 10 searches for the points of interest in response to user input.

For this example, it is assumed that the user has specified that he wants to visit a coffee shop and so the mobile device 10 has searched for nearby coffee shops. More generally, any appropriate manner in obtaining the points of interest 23,24,25 can be employed.

Existing mobile devices might present the points of interest 23,24,25 to the user as an ordered list in terms of increasing distance from the starting location 21 as follows:

|   |   |   |
|---|---|---|
| POI 24 | 123 Fake St. | 2 km |
| POI 23 | 45 Rideau St. | 5 km |
| POI 25 | 78 Mary Ave. | 8 km |

Unfortunately, since the user wants to end up at the finishing location 22, the closest POI 24 is actually out of the way for the user. Instead, visiting the POI 25 that is farthest away from the starting location 21 is most practical because it is on the way to the finishing location 22. Whilst each point of interest 23,24,25 may be identified with an address, the user might nonetheless not know which point of interest is most practical to visit during the trip.

In accordance with an embodiment of the disclosure, for each point of interest 23,24,25, the POI practicality determiner 14 automatically determines an indication of practicality for making the point of interest 23,24,25 an intermediate location to be visited during the trip based on both the starting location 21 and the finishing location 22 for the trip. By considering both the starting location 21 and the finishing location 22, the points of interest 23,24,25 can be presented to the user in a manner that reflects how practical it is to visit the points of interest 23,24,25 given that the user is to end up at the finishing location 22.

The mobile device 10 might for example present the points of interest 23,24,25 to the user as an ordered list as follows:

|   |   |   |
|---|---|---|
| POI 25 | 78 Mary Ave. | +1 minute |
| POI 24 | 123 Fake St. | +8 minutes |
| POI 23 | 45 Rideau St. | +15 minutes |

In this example, the POI practicality determiner 14 has determined, for each point of interest 23,24,25, an indication of practicality that reflects an estimate of how much more time might be needed to visit the point of interest. This allows the user to realize that visiting the point of interest 25 on 78 Mary Ave. is likely to result in a quicker trip than if the other points of interest 23,24 are visited.

The example presented above allows the user to select one of the points of interest 23,24,25 to be visited during the trip. In alternative implementations, the POI practicality determiner 14 automatically selects one of the points of interest 23,24,25 based on practicality that has been determined. Other implementations are possible.

In the example provided above, each indication of practicality reflects an estimate of additional time to visit a point of interest. More generally, an "indication of practicality" can take any appropriate form from which the user can ascertain to some degree whether visiting a point of interest might be practical. The indication of practicality can reflect time, distance, traffic, cost (e.g. tollways), and/or other considerations of practicality. An aggregation or combination of considerations is possible. The indication of practicality can be an absolute number (e.g. total distance of trip in km), or a change thereof (e.g. additional distance for trip in km). In some implementations, the considerations of practicality are customizable by the user based on his or her preferences. For instance, the user might not care how much farther a trip becomes if visiting a point of interest, but only cares about how much extra time is needed if visiting the point of interest. Further details are provided below with reference to FIG. 3 through FIG. 13.

In the illustrated example, the POI practicality determiner 14 is implemented as software and is executed on the processor 13 of the mobile device 10. However, more generally, the POI practicality determiner 14 may be implemented as software, hardware, firmware, or any appropriate combination thereof. Although examples presented herein assume that the POI practicality determiner 14 is implemented in a mobile device, it is to be understood that alternative implementations are possible for non-mobile computing devices. For non-mobile implementations, the computing device can still determine a route for a trip, but would not likely accompany the user during the trip. Also, the starting location would not likely be obtained using GPS, but rather might be entered by the user.

In the illustrated example, it is assumed that the mobile device 10 is GPS-enabled for determining geographic location. Whilst examples presented herein focus on use of GPS, it is to be understood that alternative means for determining geographic location are possible and are within the scope of this disclosure. For example, geographic location can alternatively be determined based on cell/sector identification within cellular network. As another example, geographic location can be determined using triangulation of signals from in-range base towers, such as those used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Coarser location information can be obtained not only by triangulating the device's position based on nearby cell towers but also based on nearby Wi-Fi access points via a WLAN radio. As an alternative example, geographic location can be determined based on bar codes. Each bar code is located in a predefined location and encodes location information for that location. A mobile device, upon scanning/taking picture of one of these bar codes, can obtain the location information. The bar codes can be 1-dimensional, or 2-dimensional. Other means for determining geographic location may be possible.

Method for Determining Practicality

Figure 3:
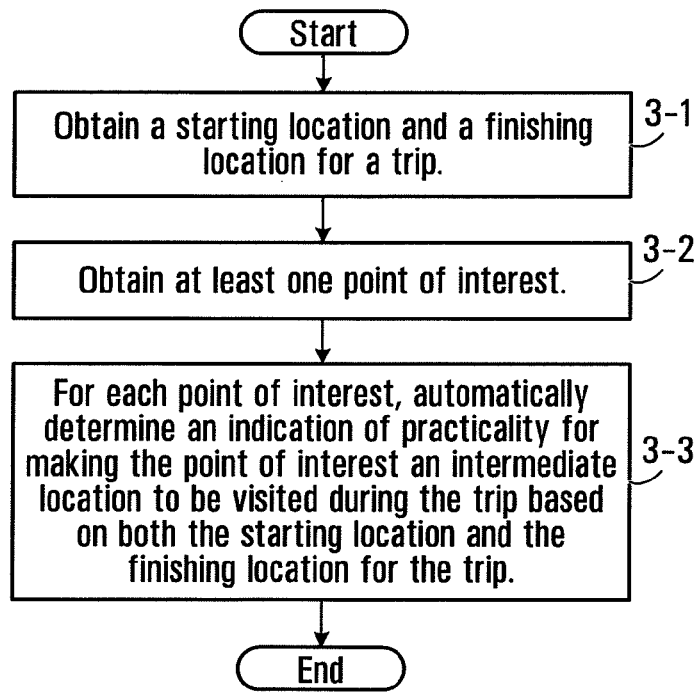
FIG. 3 is a flowchart of a method of automatically determining practicality for visiting a point of interest during a trip.

Referring now to FIG. 3, shown is a flowchart of a method of automatically determining practicality for visiting a point of interest during a trip. This method may be implemented in a computing device, for example by the POI practicality determiner 14 of the mobile device 10 shown in FIG. 1. Alternatively, this method may be implemented in any appropriately configured computing device, regardless of whether the computing device is mobile.

At step 3-1, the computing device obtains a starting location and a finishing location for a trip. Examples of how this can be accomplished have been described above with reference to FIG. 1 and FIG. 2. At step 3-2 the computing device obtains at least one point of interest. Examples of how this can be accomplished have been described above with reference to FIG. 1 and FIG. 2. At step 3-3, for each point of interest, the computing device automatically determines an indication of practicality for making the point of interest an intermediate location to be visited during the trip based on both the starting location and the finishing location for the trip. By considering both the starting location and the finishing location, the points of interest can be presented to the user in a manner that reflects how practical it is to visit the points of interest given that the user is to end up at the finishing location 22. An example of this has been presented above with reference to FIG. 1 and FIG. 2.

There are many ways to automatically determine the indication of practicality. In some implementations, for each point of interest, the computing device automatically determines the indication of practicality by automatically estimating how long the trip will become if the point of interest is visited during the trip. In this manner, the indication of practicality includes an indication of expediency. The determination might for example involve automatically estimating how much travel time will be needed, how much travel distance will be needed, and/or how much traffic will be experienced if the point of interest is visited. In some implementations, travel distance and travel time can be estimated using map data maintained on the computing device. In some implementations, traffic can be estimated using traffic information received for example via satellite radio.

Alternatively, or additionally, for each point of interest, the computing device automatically determines the indication of practicality by automatically estimating how expensive the trip will become if the point of interest is visited during the trip. In this manner, the indication of practicality includes an indication of expense. The determination might for example involve automatically determining presence of any tollways for the trip. Use of a tollway for a trip in order to visit a point of interest might be undesirable for the user. It might be useful for the user if the indication of practicality indicates whether a tollway is used.

More generally, one or more appropriate measure of practicality can be considered when determining an indication of practicality for visiting a point of interest. In some implementations, the computing device maintains trip settings defining at least one measure of practicality. Thus, for each point of interest, the computing device automatically determines an indication of practicality for making a point of interest an intermediate location to be visited during a trip in accordance with the trip settings. In some implementations, the trip settings can be manipulated by the user. In other implementations, the trip settings are static and cannot be changed by the user.

Figure 4:
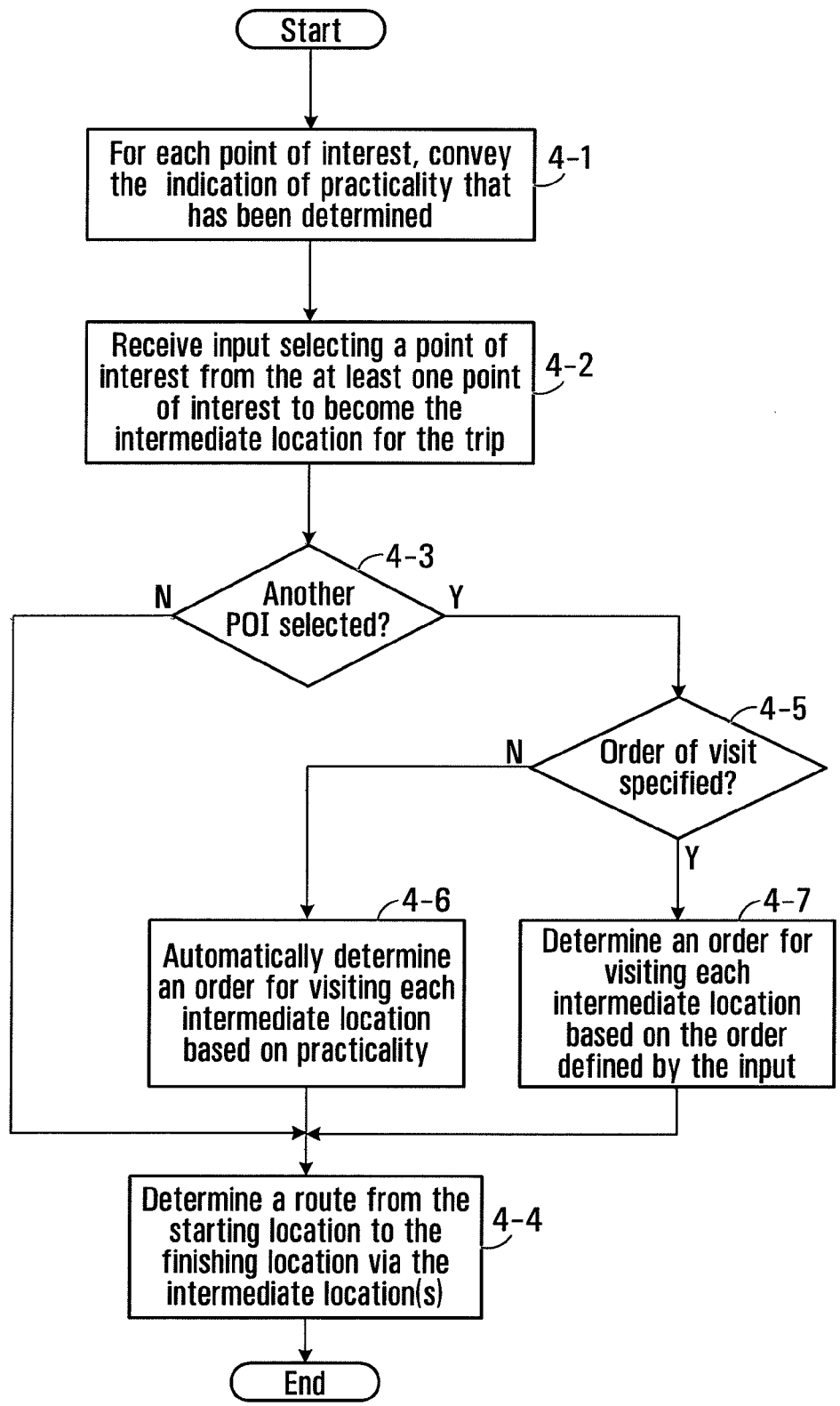
FIG. 4 is a flowchart of a method of determining a route for a trip via each selected point of interest.

Referring now to FIG. 4, shown is a flowchart of a method of determining a route for a trip via each selected point of interest. This method may be implemented in a computing device, for example by the POI practicality determiner 14 of the mobile device 10 shown in FIG. 1. Alternatively, this method may be implemented in any appropriately configured computing device, regardless of whether the computing device is mobile.

For this example it is assumed that the computing device has determined, for each of at least one point of interest, an indication of practicality for making the point of interest an intermediate location to be visited during a trip. At step 4-1, for each point of interest, the computing device conveys the indication of practicality that has been determined. In some implementations, this involves conveying each point of interest in a list that is ordered by decreasing practicality. Examples of this have been described above with reference to FIG. 1 and FIG. 2.

At step 4-2, the computing device receives input selecting a point of interest from the at least one point of interest to become an intermediate location for the trip. The computing device might also receive input selecting another point of interest at step 4-3. If only one point of interest is selected, then at step 4-4 the computing device determines a route from the starting location to the finishing location via the intermediate location.

However, if more than one point of interest is selected, then at steps 4-6 and 4-7 the computing device determines an order for visiting the points of interest. In particular, if there is no user input specifying an order, then at step 4-6 the computing device automatically determines an order for visiting each intermediate location based on practicality. Example considerations of practicality as discussed above include time, distance, traffic, cost (e.g. tollways), and/or other considerations of practicality. However, if there is user input specifying an order, then at step 4-7 the computing device determines the order for visiting each intermediate location based on the user input. Note that the user input can completely specify the order, or only partially specify the order. An example of partially specifying the order is when there are three intermediate locations and one of which is specified to be visited first while nothing is specified for the other two. In this example, the order of the other two points of interest can be determined based on practicality.

There are many possibilities for the user input specifying an order. In some implementations, for each intermediate location, there is a field to indicate at which stop the user will be visiting that location. Not filling in the field or entering a special code indicates that the order is not important for this particular location. Other implementations are possible.

As described above with reference to FIG. 1 and FIG. 2, alternative implementations are possible in which the computing device automatically selects one of the points of interest based on practicality. For such alternative implementations, there is no user input for selecting a point of interest to be visited during the trip.

In the example presented above with reference to FIG. 4, it is assumed that the user selects a first point of interest before any other points of interest are selected. Unfortunately, the choice of the first point of interest might be less than ideal depending on the available choices for a second point of interest (e.g. the combination of the first point of interest and the second point of interest might cause a longer trip.) In another embodiment, the mobile device determines possible combinations for visiting points of interest before any selection is performed. This might allow for a more practical trip overall. An example is described below with reference to FIG. 5.

Figure 5:
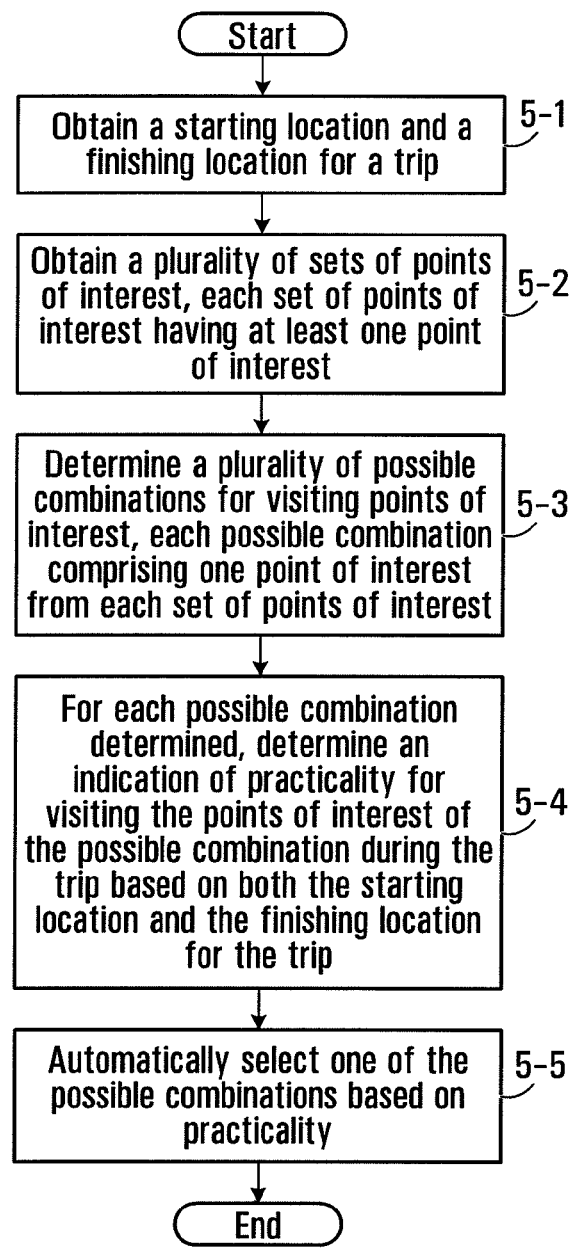
FIG. 5 is a flowchart of a method of automatically determining practicality for visiting a plurality of points of interest during a trip.

Referring now to FIG. 5, shown is a flowchart of a method of automatically determining practicality for visiting a plurality of points of interest during a trip. This method may be implemented in a computing device, for example by the POI practicality determiner 14 of the mobile device 10 shown in FIG. 1. Alternatively, this method may be implemented in any appropriately configured computing device, regardless of whether the computing device is mobile.

At step 5-1, the computing device obtains a starting location and a finishing location for a trip. Examples of how this can be accomplished have been described above with reference to FIG. 1 and FIG. 2. For this example it is assumed that the user wants to visit one coffee shop and one hamburger restaurant during the trip. Note that this particular scenario is specific and is provided for exemplary purposes only. At step 5-2, the mobile device obtains a plurality of sets of points of interest, namely a first set of coffee shops and a second set of hamburger restaurants. This can be accomplished in a similar manner as described above with reference to FIG. 1 and FIG. 2, except that it is performed for more than one set of points of interest. Each set generally has at least one point of interest. In some implementations, all points of interest of a given set are associated with one another (e.g. all coffee shops of the same company, etc.).

There might be several possible combinations of coffee shops and hamburger restaurants, especially when considering order. Unfortunately, the user might not know which particular combination of coffee shop and hamburger restaurant is most practical. Therefore, at step 5-3 the mobile device determines a plurality of possible combinations for visiting the points of interest. Each possible combination includes one point of interest from each set of points of interest (e.g. one coffee shop and one hamburger restaurant). At step 5-4, for each possible combination determined, the mobile device determines an indication of practicality for visiting the points of interest of the possible combination during the trip based on both the starting location and the finishing location for the trip. Example criteria for determining practicality have been described in the previous examples presented above.

Finally, at step 5-5 the mobile device automatically selects one of the possible combinations based on practicality. In this manner, the user is not burdened with having to determine which combination of coffee shop and hamburger restaurant is practical. Alternatively, for each possible combination, the mobile device conveys the indication of practicality that has been determined. This can for example be accomplished by conveying each possible combination in a list that is ordered by decreasing practicality. An example of this has been described in the previous examples presented above. This allows the user to select which combination of coffee shop and hamburger restaurant to visit with consideration of practicality.

As similarly described above with reference to FIG. 5, the user might specify an order for visiting the points of interest. For example, the user might specify that a hamburger restaurant is to be visited before a coffee shop. This can reduce the number of possible combinations for visiting points of interest (e.g. all combinations starting with a coffee shop are omitted). If the user does not specify an order for visiting the points of interest, then there may be more possible combinations in which case it may be possible to determine the most practical combination.

Another Communication System

Figure 6:
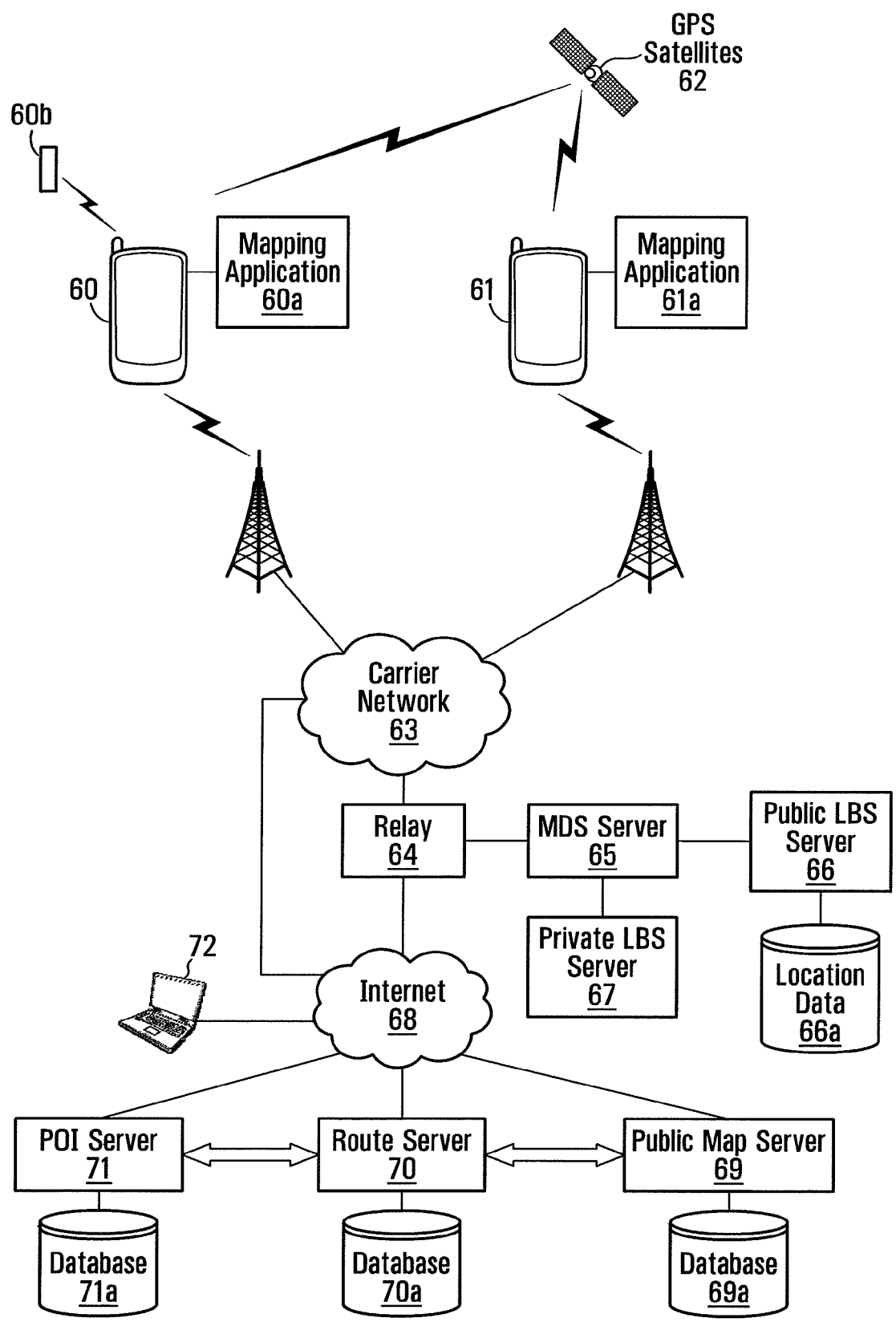
FIG. 6 is a block diagram of another example communication system.

Referring now to FIG. 6, shown is a block diagram of another example communication system within which the methods of FIG. 3 to FIG. 5 may be performed. It is to be understood that the communication system is shown with very specific pertinent components for exemplary purposes only.

The communication system has a plurality of mobile devices 60,61 (only two shown for simplicity). Each mobile device 60,61 has a mapping application 60a,61a provided in memory for rendering of visual maps in its display. The mapping functionality uses location information that is acquired using GPS satellites 62 (only one shown for simplicity). Other implementations are possible in which alternative location determining means can be employed as previously described. Whilst each mobile device 60,61 is shown to have mapping functionality, it is to be understood that alternative implementations are possible in which some of the mobile devices 60,61 do not have mapping functionality.

Some of the mobile devices 60,61 may be adapted for telephony functionality. The telephony functionality can include circuit switched voice calls and/or packet switched voice calls. To permit use of a mapping application during a telephone conversation, a headset 60b can be employed. The headset 60b can be wired or wireless using Bluetooth™ technology for example. Other implementations are possible in which alternative hands-free means can be employed. For example, a hands-free vehicle speaker and microphone can be used. Alternatively, some of the mobile devices 60,61 can be configured to work in a hands-free mode in which no additional hardware is used.

In some implementations, the mobile devices 60,61 are provided with all mapping data for the mapping functionality. In this manner, there is no reliance on a system of network components to provide the mapping functionality. In other implementations, the mobile devices 60,61 are adapted to interoperate with a system of network components to provide the mapping functionality. An example of this is depicted in FIG. 6 in which the mobile devices 60,61 operate over a PLMN (Public Land Mobile Network) or simply a carrier network 63. The carrier network 63 allows communication with a relay 64, which might occur through a firewall (not shown). A request for map data from any one of the mobile devices 60,61 is received at the relay 64 for processing.

In a first implementation, the request is passed via a secure channel to an MDS (mobile data system) server 65. The request is then passed to a public LBS (location-based service) server 66, which has access to location data 66a and provides location-based services to handle the request. Whilst only one public LBS server 66 is shown, other implementations are possible in which there may be a plurality of public LBS servers where requests are distributed and processed through a load distributing server (not shown). The location data 66a may be stored on the public LBS server 66 via a network database, or on a separate LBS data server (not shown). The public LBS server 66 queries the location data 66a and provides a response to the request to the MDS server 65. In some implementations, as shown in FIG. 6, the MDS server 65 adds private corporate data stored on a private LBS server 67 to the response. The MDS server 65 then provides the response on a secure return path via the relay 64 and the carrier network 63 to the mobile device 60,61 that issued the request.

In a second implementation, where no corporate servers are provided to support LBS services for a particular enterprise, for example individual consumer handsets, the request may be passed via the relay 64 over a computer or communication network such as the Internet 68. The request can then be provided to a public map server 69 having one or more accessible databases 69a, a route server 70 having one or more accessible databases 70a, and a point of interest server 71 having one or more accessible databases 71a. The servers 69,70,71 are publicly accessible via the Internet 68. The public map server 69 may be any suitable publicly-accessible map server such as one provided by Yahoo™, Expedia™, or Google™ to name but a few. In some implementations, the public map server 69 provides for interactive map functionality. A response to the request is provided on a return path via the relay 64 and the carrier network 63 to the mobile device 60,61 that issued the request.

In some implementations, some of the mobile devices 60,61 can communicate over the Internet 68 with a computer device 72 such as a PC (desktop or laptop) that may or may not have a mapping application installed therein. The communication can for example include a packet switched voice call, which can for example use VoIP (Voice over Internet Protocol) or SIP (Session Initiation Protocol). Other forms of packet switched communication are possible. For example, a meeting link may be sent to or accessible from the computer device 72.

Exemplary Display Screens

Referring now to FIG. 7 through FIG. 12, shown are schematics of exemplary display screens. The display screens might be displayed by a mobile device, for example by the user interface 11 of the mobile device 10 shown in FIG. 1, or by a user interface of one of the mobile devices 60,61 shown in FIG. 6. It is to be understood that the display screens are shown with very specific pertinent details for exemplary purposes only.

Figure 7:
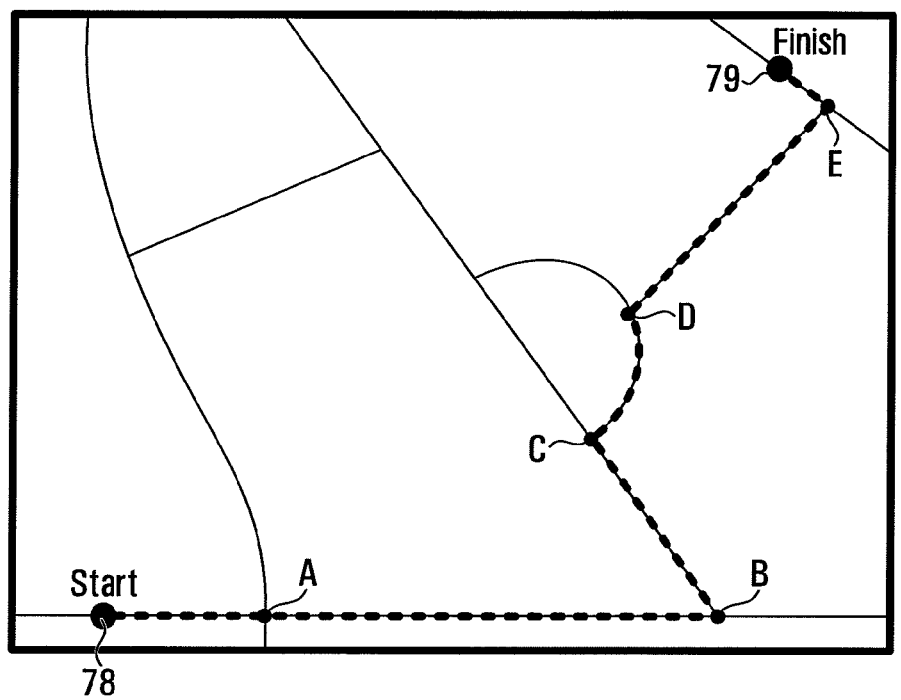
FIG. 7 is a schematic of an example display screen featuring a route on a map.

Referring first to FIG. 7, shown is a schematic of an example display screen featuring a route on a map. The route is constructed using a get directions query from a starting location 78 to a finishing location 79. There are options for determining the starting location and the finishing location, such as where I am, street address, map selection etc. The route includes various navigation points A,B,C,D,E.

Figure 8:
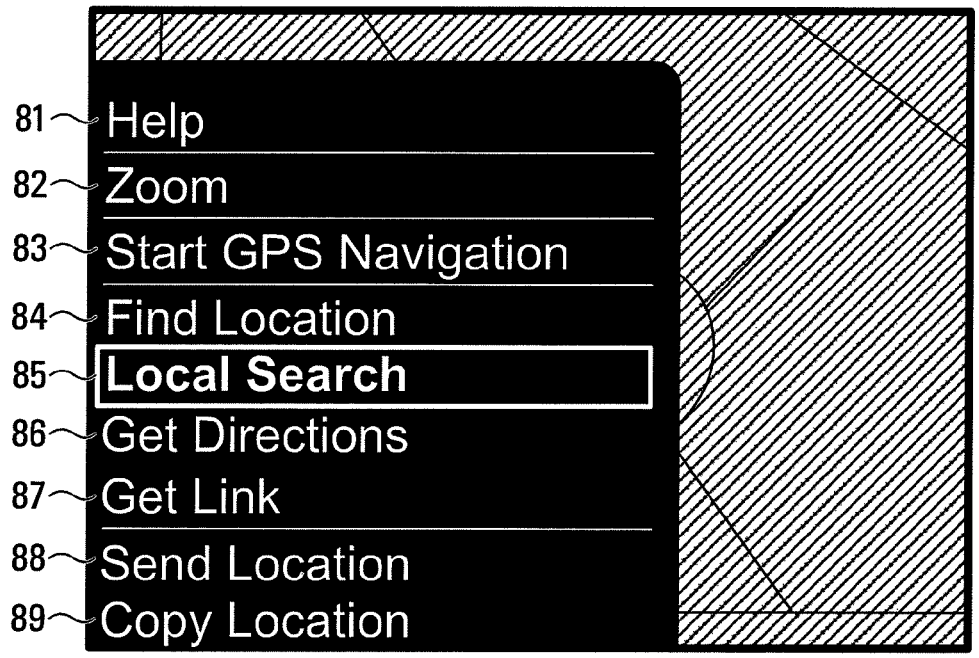
FIG. 8 is a schematic of an example display screen featuring an options menu.

Referring now to FIG. 8, shown is a schematic of an example display screen featuring an options menu. The options menu includes nine options: Help 81, Zoom 82, Start GPS Navigation 83, Find Location 84, Local Search 85, Get Directions 86, Get Link 87, Send Location 88, and Copy Location 89. Selection of Local Search 85 produces a search dialogue box for enabling the user to select a search as will be described below.

Figure 9:
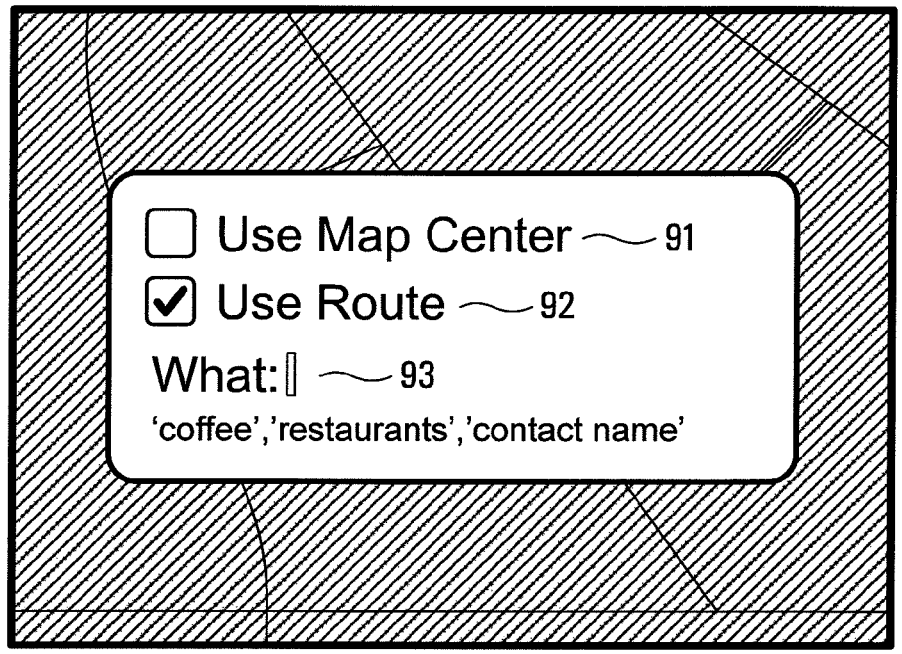
FIG. 9 is a schematic of an example display screen featuring a search dialogue box.

Referring now to FIG. 9, shown is a schematic of an example display screen featuring a search dialogue box. The search dialogue box includes two options: use map center 91, and use route 92. A user can select one of these two options and enter a search query using a freeform search 93. In this case, it is assumed that the user has entered a search query to search for points of interest along/proximal to the route shown in FIG. 7. Entering the search query produces search results on the map as will be described below.

Figure 10:
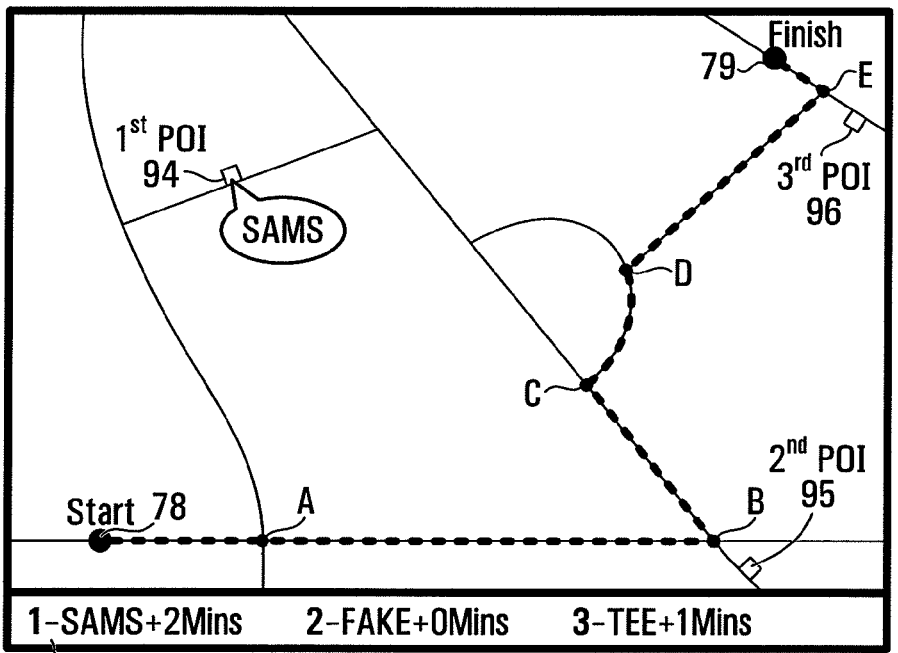
FIG. 10 is a schematic of an example display screen featuring search results on the map.

Referring now to FIG. 10, shown is a schematic of an example display screen featuring search results on the map. The search results include three points of interest: $1^{st}$ POI 94, $2^{nd}$ POI 95, and $3^{rd}$ POI 96. A user can rollover any one of the POIs 94,95,96 to view more details. In the illustrated example, it is assumed that the user has rolled over the $1^{st}$ POI 94 causing details to be displayed indicating that the $1^{st}$ POI 94 corresponds to Sam's house. Additional information (not shown) can be displayed in some implementations. The additional information can for example include street address, phone number, and/or geographic longitude and latitude information.

A POI selection list 98 is provided with information concerning how practical it is to visit each POI 94,95,96 during the trip. In the illustrated example, indication is provided that visiting the $1^{st}$ POI 94 corresponding to Sam's house would add 2 minutes of travel time, visiting the $2^{nd}$ POI 95 corresponding to Fake would add 0 minutes of travel time, and visiting the $3^{rd}$ POI 96 corresponding to Tee would add 1 minute of travel time. More generally, any suitable indication of practicality for making a point of interest an intermediate location to be visited during the trip based on both the starting location 78 and the finishing location 79 for the trip can be employed as previously described.

Note that while the $1^{st}$ POI 94 is significantly farther away from the route than the other POIs 95,96, the additional travel time to visit the $1^{st}$ POI 94 is not significantly more than the additional travel time to visit the other POIs 95,96. This is because a completely different route is possible (see FIG. 12) in which the $1^{st}$ POI 94 can be visited without introducing any significant additional travel time. For this reason, the mobile device does not necessarily compute the indications of practicality based on proximity to the route that has been initially determined. Rather, the mobile device more generally computes the indications of practicality based on both the starting location 78 and the finishing location 79 for the trip. However, implementations in which an indication of practicality is determined based on proximity to a route are possible and are within the scope of this disclosure.

Figure 11:
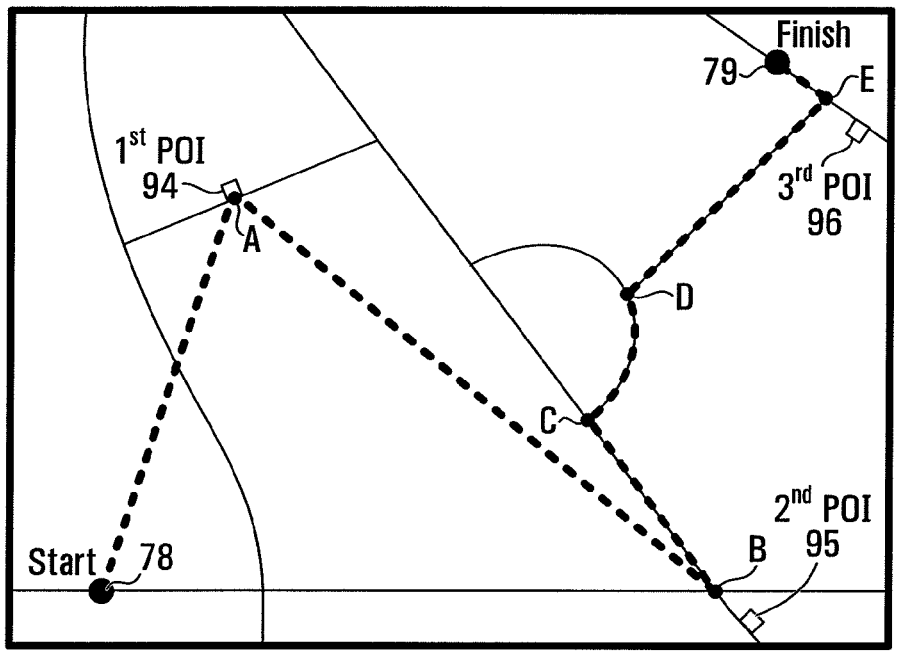
FIG. 11 is a schematic of an example display screen featuring pushing of a navigation point.

The POI selection list 98 enables the user to select one of the POIs by inputting a corresponding number (i.e. 1, 2 or 3). In the illustrated example, it is assumed that the user wishes to select the $1^{st}$ POI 94 corresponding to Sam's house. The user can therefore enter '1' in order to select the $1^{st}$ POI 94 corresponding to Sam's house. Alternatively, the user can push a navigation point to where Sam's house is located. For example, as shown in FIG. 11, navigation point A is pushed to where Sam's house is located. Regardless of how the selection is performed, the mobile device will then reroute the navigation points A,B,C,D,E so that a new route results that includes the $1^{st}$ POI 94 corresponding to Sam's house as will be described below.

Figure 12:
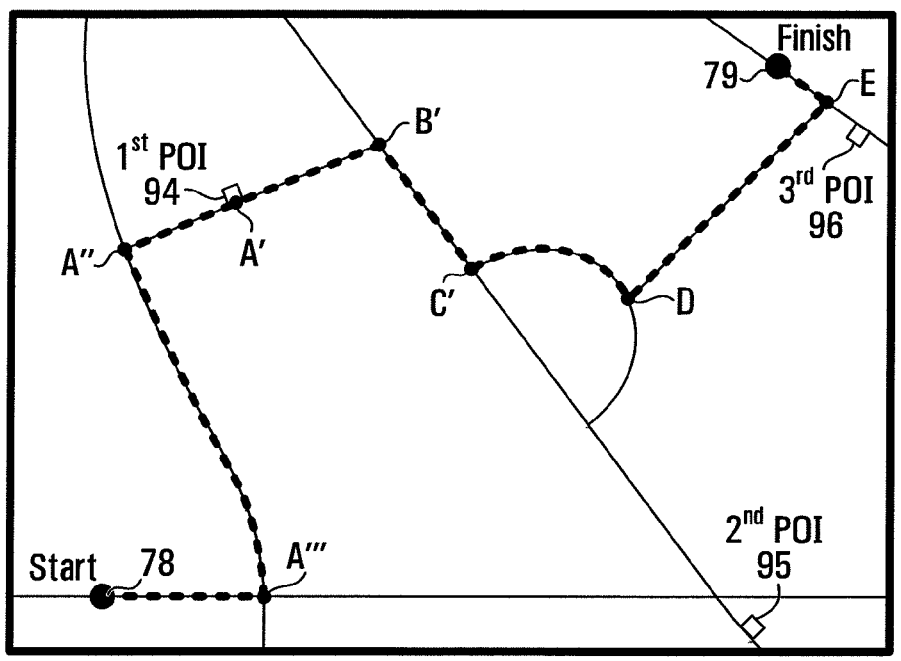
FIG. 12 is a schematic of an example display screen featuring a new route on the map.

Referring now to FIG. 12, shown is a schematic of an example display screen featuring a new route on the map. Note that the new route includes the $1^{st}$ POI 94 corresponding to Sam's house. The new route is based on a new set of navigation points $A^{III}, A^{II}, A^{I}, B^{I}, C^{I}, D, E$ based on the rerouting. Optionally, the user can select additional points of interest to visit during the trip as previously described.

Another Mobile Device

Figure 13:
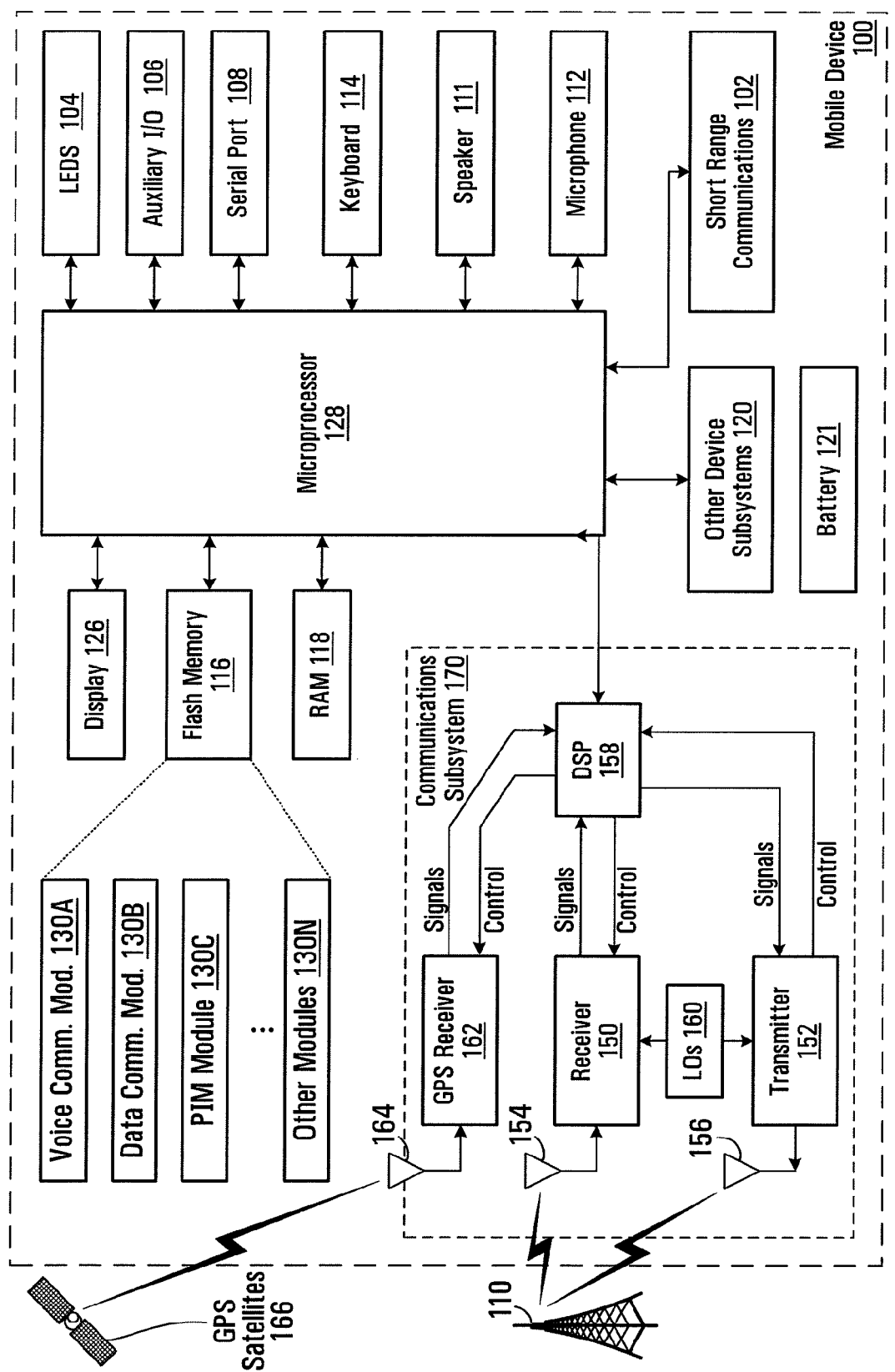
FIG. 13 is a block diagram of another mobile device.

Referring now to FIG. 13, shown is a block diagram of another mobile device 100 that may implement any of the device methods described herein. The mobile device 100 is shown with specific components for implementing features similar to those of the mobile device 10 shown in FIG. 1. It is to be understood that the mobile device 100 is shown with very specific details for exemplary purposes only.

A processing device (a microprocessor 128) is shown schematically as coupled between a keyboard 114 and a display 126. The microprocessor 128 is a type of processor with features similar to those of the processor 13 of the mobile device 10 shown in FIG. 1. The microprocessor 128 controls operation of the display 126, as well as overall operation of the mobile device 100, in response to actuation of keys on the keyboard 114 by a user. Whilst the mobile device 100 is shown with a particular input peripheral, namely the keyboard 114, it is to be understood that any suitable input peripheral can be used. In other implementations, the mobile device 100 is provided with a touch screen. Other implementations are possible.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The keyboard 114 and display 126 are part of a user interface with features similar to the user interface 11 of the mobile device 10 shown in FIG. 1. The mobile device 100 may have a battery 121 to power the active elements of the mobile device 100. The mobile device 100 is in some embodiments a two-way radio frequency (RF) computing device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the POI practicality determiner 14 of the mobile device 10 shown in FIG. 1. In a specific implementation, the other module 130N of the flash memory 116 stores computer executable instructions that when executed implement a POI practicality determiner. Note that the implementations described with reference to FIG. 13 are very specific for exemplary purposes.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. The GPS receiver 162 has features similar to the GPS receiver 12 of the mobile device 10 shown in FIG. 1. In addition, the communication subsystem 170 also includes a processing module, such as a digital signal processor (DSP) 158, and local oscillators (LOs) 160. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

I claim:

1. A method for execution in a computing device, the method comprising:
    maintaining trip settings defining preferences for combining considerations of practicality for making a given point of interest an intermediate location to be visited during a given trip;
    obtaining a starting location and a finishing location for a trip;
    obtaining a plurality of sets of points of interest, each set of points of interest having at least one point of interest;
    determining a plurality of possible combinations for visiting points of interest, each possible combination comprising one point of interest from each set of points of interest; and
    for each possible combination determined, automatically determining an indication of practicality for visiting the points of interest of the possible combination during the trip based on both the starting location and the finishing location for the trip;
    wherein for each possible combination determined, automatically determining the indication of practicality for visiting the points of interest of the possible combination comprises:
    automatically estimating how long the trip will become if the points of interest of the possible combination are visited during the trip to produce a first consideration;
    automatically estimating how expensive the trip will become if the points of interest are visited during the trip to produce a second consideration; and
    creating a combination of the first and second considerations according to the trip settings to determine the indication of practicality.

2. The method of claim 1, wherein automatically estimating how long the trip will become if the points of interest of the possible combination are visited during the trip comprises at least one of:
    automatically estimating how much travel time will be needed in order to visit the points of interest during the trip;
    automatically estimating how much travel distance will be needed in order to visit the points of interest during the trip; and
    automatically estimating how much traffic will be experienced during the trip if the points of interest are visited.

3. The method of claim 1, wherein automatically estimating how expensive the trip will become comprises:
    automatically determining presence of any tollways for the trip.

4. The method of claim 1, further comprising:
    for each possible combination determined, conveying the indication of practicality that has been determined.

5. The method of claim 4, wherein for each possible combination determined, conveying the indication of practicality that has been determined comprises:
    conveying each possible combination determined in a list that is ordered by decreasing practicality.

6. The method of claim 1, further comprising:
    receiving input selecting a combination from the possible combinations determined so that the points of interest of that combination become intermediate locations for the trip; and
    determining a route from the starting location to the finishing location via the intermediate locations.

7. The method of claim 6, further comprising:
    receiving input selecting at least another point of interest to become another intermediate location(s) for the trip;
    wherein determining the route from the starting location to the finishing location comprises determining the route via each intermediate location that has been selected.

8. The method of claim 7, wherein determining the route from the starting location to the finishing location via each intermediate location comprises:
    automatically determining an order for visiting each intermediate location based on practicality; or
    receiving input defining the order for visiting each intermediate location.

9. The method of claim 1, further comprising:
    receiving input for manipulating the trip settings; and
    manipulating the trip settings according to the input.

10. The method of claim 1, wherein for each set of points of interest, the at least one point of interest comprises a plurality of points of interest.

11. A non-transitory computer readable medium having computer executable instructions stored thereon for execution on a processor of a computing device so as to implement the method of claim 1.

12. A computing device comprising:
    a processor; and
    a POI practicality determiner configured for:
        maintaining trip settings defining preferences for combining considerations of practicality for making a given point of interest an intermediate location to be visited during a given trip;
        obtaining a starting location and a finishing location for a trip;
        obtaining a plurality of sets of points of interest, each set of points of interest having at least one point of interest;
        determining a plurality of possible combinations for visiting points of interest, each possible combination comprising one point of interest from each set of points of interest; and
        for each possible combination determined, automatically determining an indication of practicality for visiting the points of interest of the possible combination during the trip based on both the starting location and the finishing location for the trip;
        wherein for each possible combination determined, the POI practicality determiner is configured for automatically determining the indication of practicality for visiting the points of interest of the possible combination by:
        automatically estimating how long the trip will become if the points of interest are visited during the trip to produce a first consideration;
        automatically estimating how expensive the trip will become if the points of interest are visited during the trip to produce a second consideration; and creating a combination of the first and second considerations according to the trip settings to determine the indication of practicality.

13. The computing device of claim 12, wherein the computing device is a mobile device.

14. The computing device of claim 12, further comprising:
a GPS receiver configured for receiving GPS signals for determining a location of the computing device.

15. The computing device of claim 12, further comprising:
a user interface;
wherein for each possible combination determined, the POI practicality determiner is configured for conveying the indication of practicality that has been determined using the user interface.

16. The computing device of claim 12, wherein for each set of points of interest the at least one point of interest comprises a plurality of points of interest.

* * * * *